Aug. 7, 1956

E. LAXO ET AL 2,757,627

DOUBLE SEAMER

Filed Feb. 15, 1954

INVENTORS
ED LAXO
THOMAS C. WERGE

BY
Edward B. Fogg

ATTORNEY

Aug. 7, 1956  E. LAXO ET AL  2,757,627
DOUBLE SEAMER
Filed Feb. 15, 1954  6 Sheets-Sheet 4

INVENTORS
ED LAXO
THOMAS C. WERGE
BY Edward B. Legg
ATTORNEY

Aug. 7, 1956 — E. LAXO ET AL — 2,757,627
DOUBLE SEAMER
Filed Feb. 15, 1954 — 6 Sheets-Sheet 5
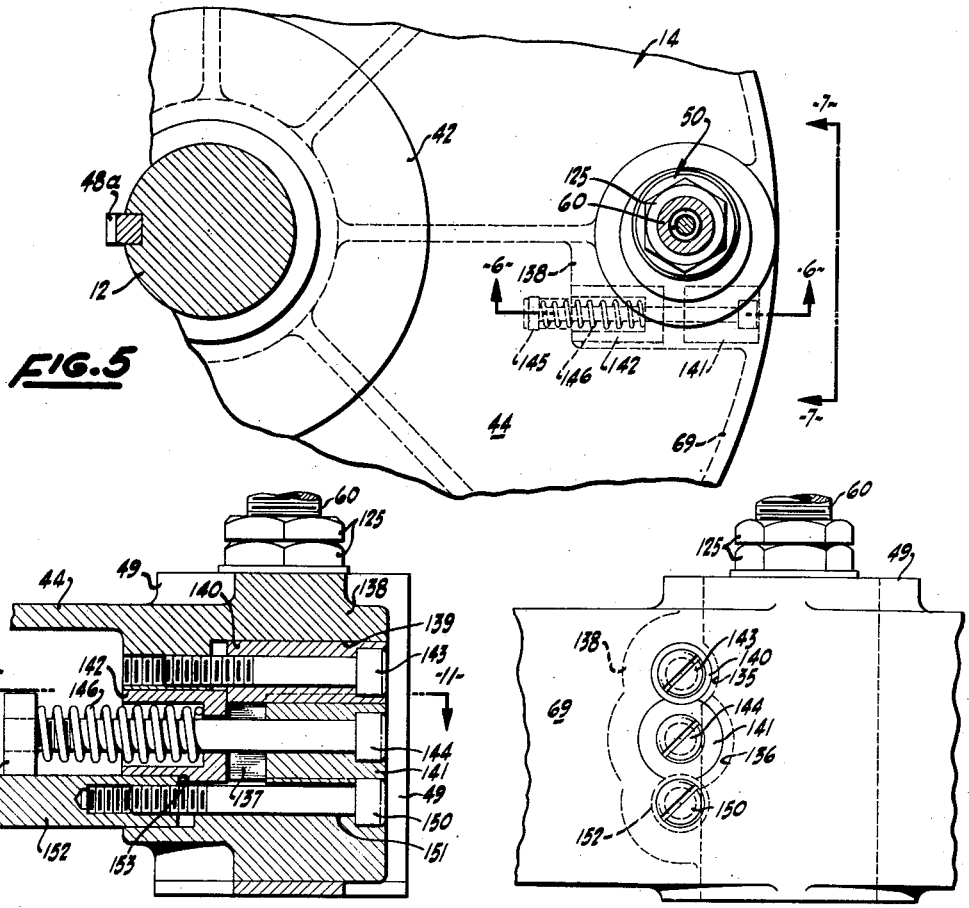
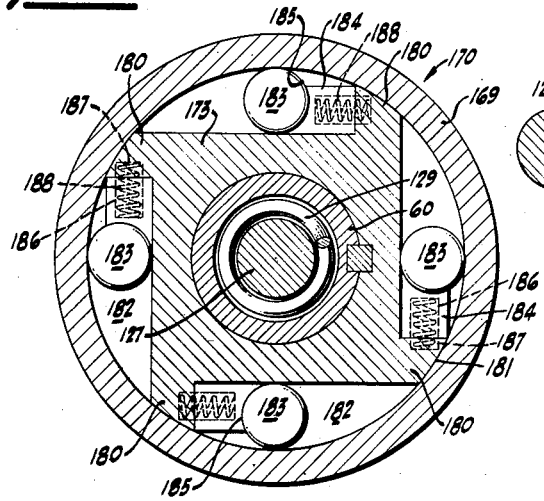
INVENTORS
ED LAXO
THOMAS C. WERGE
BY Edward B. Fugg
ATTORNEY Aug. 7, 1956 E. LAXO ET AL 2,757,627
DOUBLE SEAMER
Filed Feb. 15, 1954 6 Sheets-Sheet 6
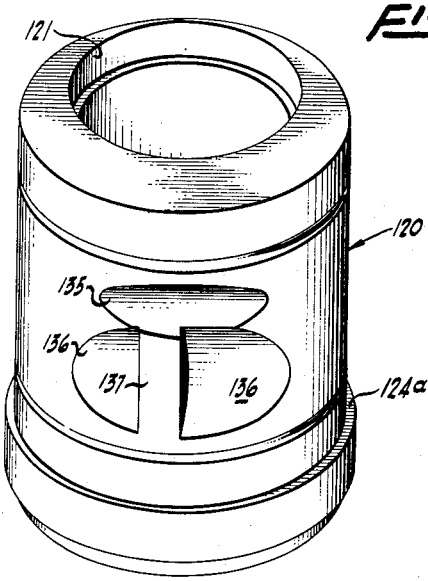
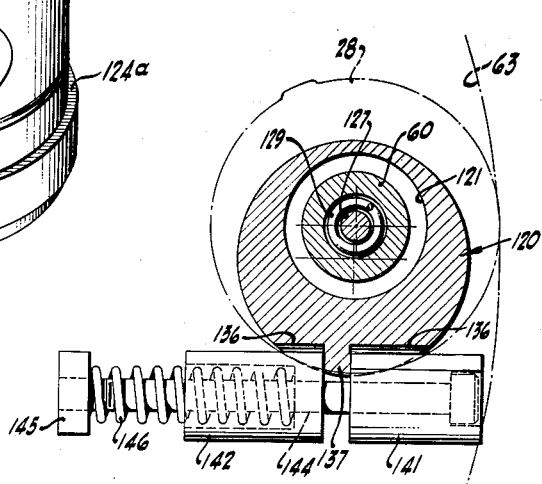
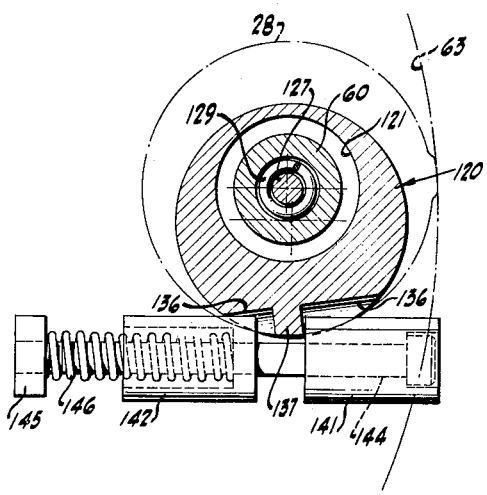
INVENTORS
ED LAXO
THOMAS C. WERGE
BY
ATTORNEY

United States Patent Office 2,757,627
Patented Aug. 7, 1956

2,757,627
DOUBLE SEAMER

Ed Laxo, Oakland, and Thomas C. Werge, San Leandro, Calif., assignors to W. F. and John Barnes Company, Rockford, Ill., a corporation of Illinois Application February 15, 1954, Serial No. 410,374

6 Claims. (Cl. 113—17)

This invention relates to a double seamer or closing machine for joining can ends and can bodies. More particularly this invention relates to a closing machine of the ring-type such as described and claimed in the co-pending application of one of us, Laxo Serial No. 163,585, filed May 23, 1950, entitled "Double Seamer," such application being referred to hereinafter as the "Laxo application," now United States Patent No. 2,727,481, issued December 20, 1955.

The double seamer or closing machine of the Laxo application employs a seaming bar having a seaming groove therein, and it also employs one or more pairs of chucks. Each pair of chucks comprises a lifter chuck or lifter pad which supports a can body and can end and a seaming chuck which clamps the can end to the can body and cooperates with the seaming bar to form a double seam. (It will be understood, of course, that in certain instances an end seam may be formed which is not a double seam.) The chucks are revolved about a central axis and simultaneously each pair of chucks (i. e., a seaming chuck and the corresponding lifter chuck or pad), rotate or spin about their own, individual axis to impart to the can body and can end a rolling or spinning motion along the seaming bar.

In the double seamer or closing machine of the Laxo application, the seaming chucks are urged resiliently toward the seaming bar by suitable means such as one or more springs. These springs hold each seaming chuck in operative engagement with the seaming bar but they permit yielding or retraction of the seaming chuck from the seaming bar in response to an extra thickness of metal, as at the junction of double or end seam and the can body side seam. Among the advantages of such a construction and of such a yielding action, as set forth in the Laxo application, are that the splitting of metal due to excessive pressure is avoided, yet each chuck is held in operative engagement with the seaming bar at all times. Yielding occurs only at the point where needed, and, as a consequence, loose or defective double seams are avoided.

In the operation of the closing machine of the Laxo application certain problems have revealed themselves among which may be mentioned the following:

As stated above, the seaming chuck revolves about its own axis as it revolves about the central axis of the machine. This rotation may be accomplished by frictional engagement of the seaming chuck and the can body and can end with the seaming bar, or it may be accomplished by a positive drive such as a ring gear fixed to the frame of the machine and a pinion meshing with the ring gear and fixed to the spindle of the seaming chuck.

If frictional engagement of the seaming chuck, and of the can body and can end with the seaming bar is relied upon to rotate the seaming chuck, a difficulty arises as follows: From time to time, the frictional force between the seaming chuck and the can body and can end, on the one hand, and the seaming bar, on the other hand, is insufficient to rotate the seaming chuck. As a result, the can body and can end skid along the seaming bar. Such skidding is disadvantageous because it does not accomplish a uniform seaming operation.

A positive drive of the type described has a disadvantage, but for another reason. At all times during the seam formation there is, of course, a frictional engagement between the seaming chuck and can body and can end, on the one hand, and the seaming bar, on the other hand. Such frictional engagement tends to rotate the seaming chuck and its spindle about the spindle axis. The speed of rotation or angular velocity thus imparted to the seaming chuck through such frictional engagement, is a function of the rotary speed or angular velocity of the seaming chuck about the central axis of the machine in revolutions per minute, of the radial distance of the outer edge of the seaming chuck from the central axis of the machine and of the radius of the seaming chuck. To put the matter in other words, and assuming there is no slippage, the angular velocity or spin of the seaming chuck about its own axis is determined by its linear speed and by its radius. It happens, however, that the radial distance from the central axis of the machine to the outer edge of the chuck, is a variable quantity. This results from the fact that, at the commencement of the seaming operation, the curl of the can end and the end flange of the can body overhang the side wall of the can body some considerable distance, e. g., about 0.185 inch. But as the end seam is formed this overhang is progressively reduced and, at the end of the seaming operation, the overhang may be approximately 0.046 inch. It will, therefore, be apparent that the radial distance abovementioned is a variable, hence that the angular velocity imparted to the seaming chuck by friction will vary. Meanwhile, if a positive drive in the form of a ring gear and chuck are employed, such positive drive tends to impart a constant angular velocity to the chuck and its spindle about the spindle axis. The resulting differential between the two forces tending to rotate the seaming chuck about its spindle axis, is disadvantageous; e. g., skidding may occur.

It is, therefore, an object of the present invention to provide a means for positively rotating the seaming chuck of a rotary, ring-type seamer or closing machine such as described in the Laxo application, said means being of a character such that it permits the seaming chuck to rotate freely in response to the frictional force tending to spin it, but which will take over and positively rotate or spin the seaming chuck whenever the seaming chuck tends to skid.

Yet another object of the invention is to provide an improved form for mounting and exerting a yieldable resilient force on the seaming chuck of the type described above.

Still another object of the invention is to provide a double seamer or closing machine capable of high speed operation and of carrying out the seaming or closing operation under aseptic conditions for aseptic canning purposes.

These and other objects will be apparent from the ensuing description and the appended claims.

One form of the invention is illustrated by way of example in the accompanying drawings, in which, Figure 1 is a staggered sectional view taken through the machine along the line 1—1 of Figure 3.

Figure 5 is a fragmentary plan view, partly in section, taken along the line 5—5 of Figure 1 and showing the mounting for the seaming chuck and its spindle.

Figure 6 is a view, partly in side elevation and partly in vertical section, taken along the line 6—6 of Figure 5 showing, on a larger scale and in greater detail, the mounting for the seaming chuck and spindle.

Figure 7 is a fragmentary view in side elevation of the spindle mounting, as seen along the line 7—7 of Figure 5.

Figure 8 is a section taken along the line 8—8 of Figure 1 showing, on a larger scale, the overrunning clutch for driving the seaming chuck and its spindle. The clutch is shown in disengaged condition in this figure.

Figure 9 is a fragmentary view similar to that of Figure 8 but showing the clutch in engaged condition.

Figure 10 is a view in perspective of the eccentric member of the spindle and seaming chuck mounting.

Figure 11 is a section taken along the line 11—11 of Figure 6 showing the spindle and seaming chuck mounting in its normal position.

Figure 12 is a view similar to that of Figure 11 but showing the spindle mounting in a rotated position.

Figure 1:
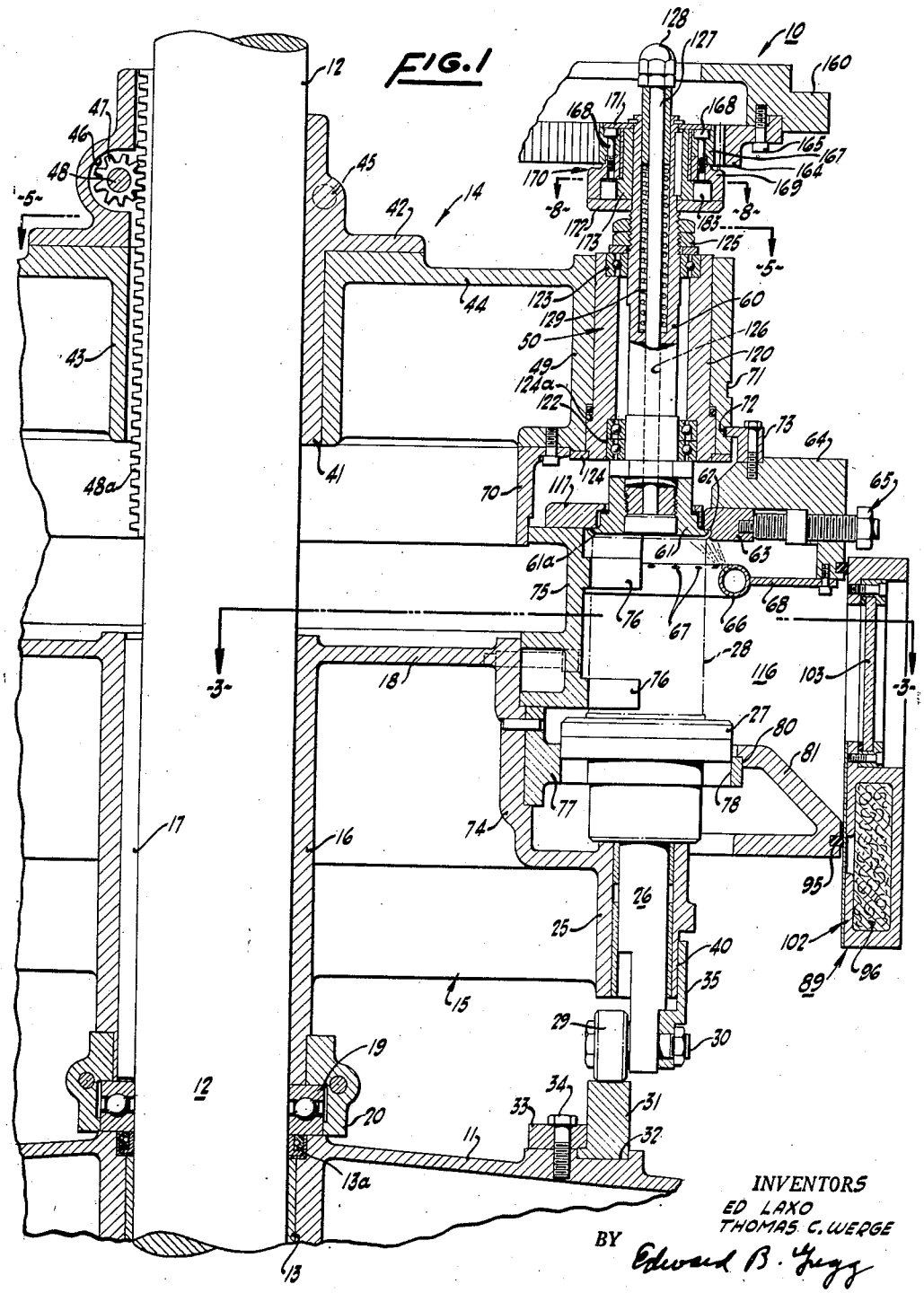
Figure 2:
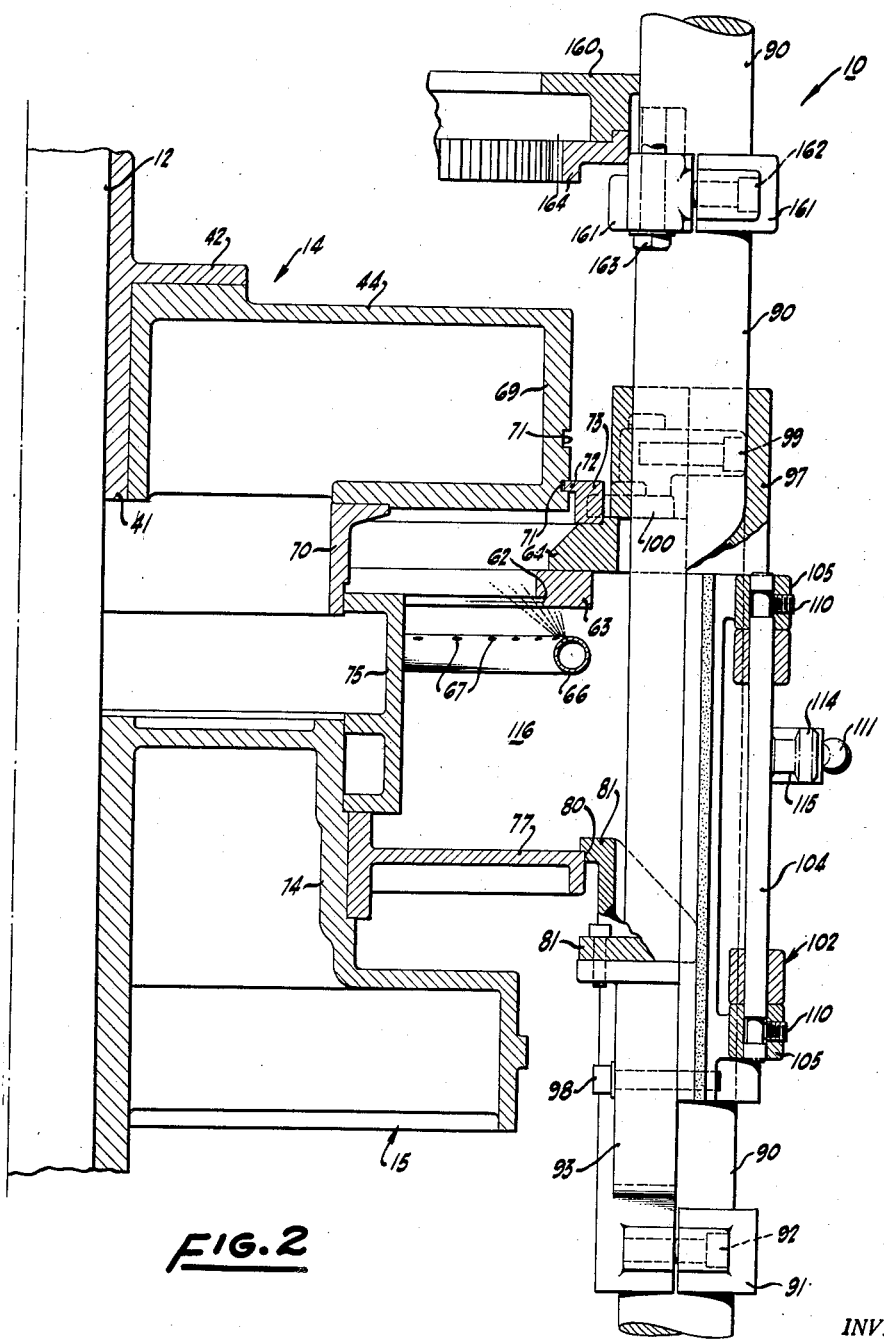
Figure 2 is a staggered section taken along the line 2—2 of Figure 3.
Figure 3:
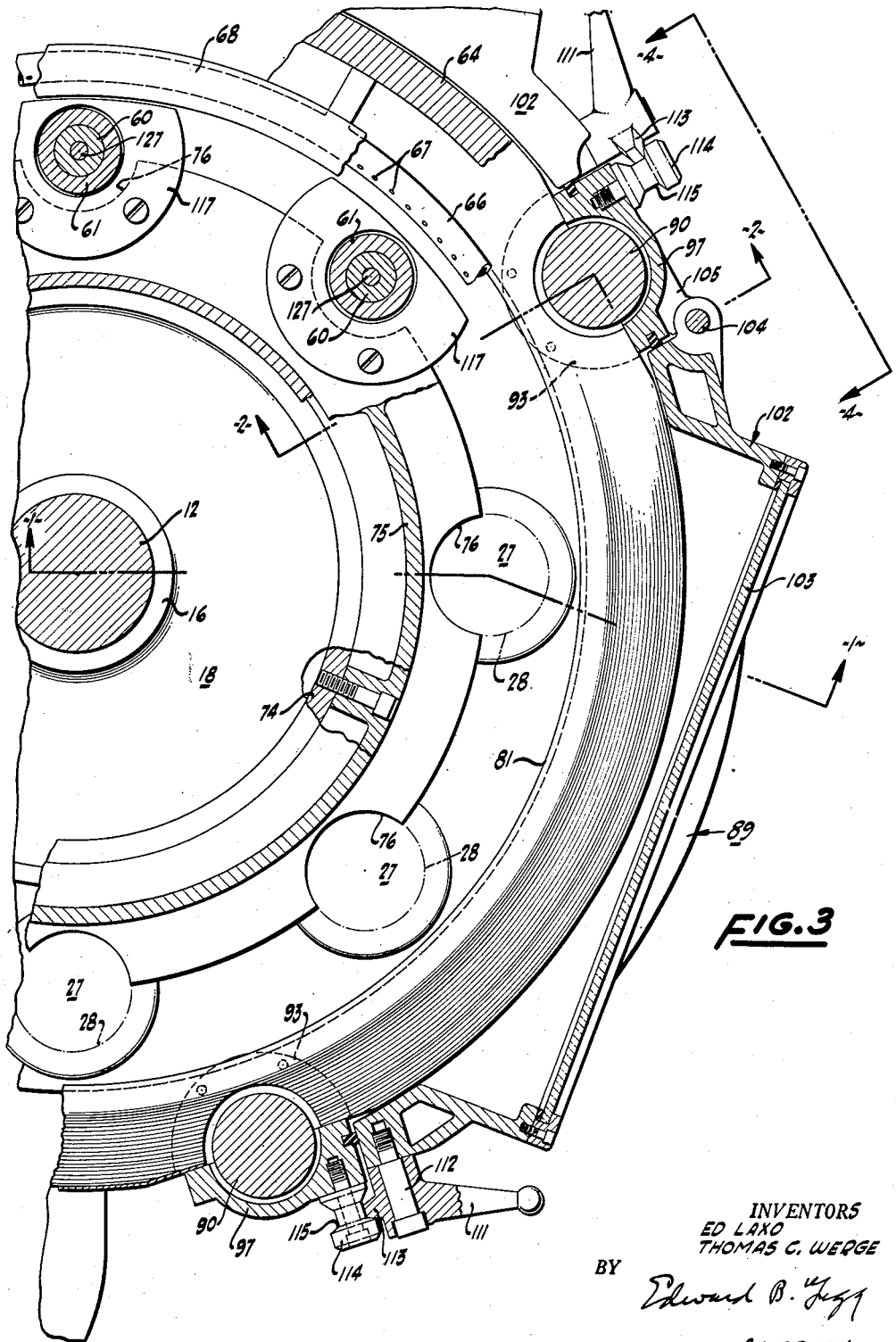
Figure 3 is a horizontal section taken along the line 3—3 of Figure 1.

Referring now to the drawings and more particularly to Figures 1, 2 and 3, the machine is generally designated by the reference numeral 10 and it comprises a frame 11 within which a main drive shaft 12 is journaled as shown at 13. A seal is provided at 13a to prevent the entry of dirt and other contaminants. The main drive shaft 12 carries an upper assembly 14 and a lower assembly 15. The lower assembly 15 comprises a casting forming a hub 16 which is keyed at 17 to the shaft 12, and a circular plate 18. The hub 16 rests upon a thrust bearing 19 and a split collar is provided at 20 to seal the bearing 19. At intervals about the lower assembly 15 there are provided sleeves 25 which are parts of the same casting and each of which slidably receives the shaft 26 of a lifter pad or chuck 27, one of which is shown in Figure 1. Each lifter pad 27 is rotatable on its shaft 26 and it supports a can body such as that shown in Figure 1 at 28, and it serves to lift the can body and a superimposed can end into operative engagement with the mating upper or seaming chuck, one of which is shown at 61 in Figure 1. At its lower end each of the shafts 26 is provided with a cam follower roller 29 rotatably mounted on a screw 30 and which rolls on a lifter cam 31 which is seated in an annular groove 32 formed in the frame of the machine. A gib 33 and cap screws 34 are employed to clamp the lifter cam 31 in place, as illustrated. Each of the shafts 26 is also provided with a shoe 35 which bears against a flattened portion 40 of the sleeve 25, such arrangement serving to prevent rotation of the shaft 26 and consequent twisting of the cam follower roller 29 on the cam 31.

The operation of the lifter pads 27 and the lower assembly 15 is known, being described in the Laxo application, hence requires no detailed description herein. Suffice it to say that can bodies and can ends are supplied in timed relationship by any suitable body feed and end feed to the machine 10. Each can body, with a can end in position on it, is deposited on one of the lifter pads 27. The main shaft 12 revolves the lower assembly 15 about the central axis of the machine, and as it revolves the cam roller 29 rolls on the lifter cam 31. A rise in the cam 31 (which is not shown) lifts the shaft 26 and pad 27, hence brings the can body and can end up firmly against the seaming chuck 61. The roller 29 continues rolling on a high dwell of the cam 31 until the seaming operation is complete. Then the roller 29 rides down a decline in the seam 31, the lifter pad 27 and the can body 28 are retracted and the closed can is taken from the machine automatically.

The upper assembly 14 comprises an inner hub 41 having a flange 42 and an outer hub 43 having a circular flange or plate 44 integral therewith. The inner hub 41 is of split construction, the parts thereof being clamped together as by means of a screw 45. The inner hub 41 is bored out at 46 to receive a pinion 47 and its shaft 48, such pinion meshing with a rack 48a which is fixed to the main drive shaft 12 of the machine. At intervals the upper assembly 14 is formed with sleeves 49, each of which is intended to receive a seaming assembly which is generally designated as 50. There will be one such seaming assembly 50 for each lifter pad 27. In assembling the components of the upper assembly as thus far described, the inner hub 41 is mounted on the shaft 12 with its pinion 47 in engagement with the rack 48a and the outer hub 43 is also mounted as illustrated and is rotated relatively to the inner hub 41 until the upper seaming assemblies 50 are in alignment with the lower or lifter pads 27. The flange 42 of the inner hub 41 is then fixed to the circular flange or plate 44 by any suitable means such as screws or dowels. A further adjustment is made for height of the can bodies 28. This is accomplished by rotating the shaft 48 one way or the other to raise or lower the upper assembly 14 until it is at the proper height for the particular can body which is to be closed. The screw 45 is then tightened to clamp the upper assembly 14 at the proper height.

The seaming chuck assembly 50, which will be described in more detail hereinafter, comprises a spindle 60 to the lower end of which is threaded a seaming chuck 61. The seaming chuck serves to clamp a can end to each can body and it has a working edge or rim 61a which is received in the seaming groove 62 of a seaming bar 63 to accomplish the double seam formation or closing operation as described in detail hereinafter. The seaming bar 63 is circular and, in the case of a double seamer, it is preferably constructed in two portions for the first and second seaming operations, respectively, as described in detail in the Laxo application. It is fixed to a circular frame member 64 by means generally indicated by the reference numeral 65, such means comprising inner and outer screws as illustrated and serving the purpose of adjusting the seaming bar 63 inwardly or outwardly as desired, and of clamping the seaming bar in adjusted position. Details as to the structure of this adjusting and clamping arrangement will be found in the Laxo application and need not be described in detail herein.

For purposes of aseptic canning such as, for example, described in Martin U. S. Patent No. 2,549,216, issued April 17, 1951, entitled "Apparatus and Method for Preserving Products in Sealed Containers," there is preferably provided a sterilizing means which may be a steam pipe such as shown at 66 having holes 67 and mounted on the frame of the machine as by means of brackets 68. As will be seen, the pipe 66 and the holes 67 are so located as to direct jets of steam or other sterilizing gas to the tops of the can bodies 28 where the double seam is being formed.

For carrying out such aseptic canning operations the space within which the can bodies travel in the machine is preferably enclosed to provide an aseptic seaming chamber. Such a seaming chamber is provided by the means shown in Figures 1 to 4 and will now be described in detail.

Referring more particularly to Figures 1 and 2, the upper assembly 14 includes a circular skirt 69 which is integral with the plate 44 and which extends 360° about the main shaft 12. The skirt 69 has a downward extension at 70 and it is provided at 71 with grooves to receive the tongue 72 of a sealing ring 73 which is fixed to the frame of the machine. The lower assembly 15 is provided with a skirt 74 which is integral with the plate 18 and which extends 360° about the drive shaft 12. A means is provided to bridge the gap between the skirt extension 70 and the lower skirt 74, such bridging means being in the form of a ring 75 which is bolted at its lower end, as illustrated in Figure 1, to the lower assembly 15 and which is in sliding engagement with the skirt extension 70 above. As illustrated in Figure 1, bifurcated holder members or yokes 76 are provided which are integral with the ring 75 and which serve to provide pockets for the reception of can bodies 28 to locate the can bodies correctly in relation to the lifter pads 27 and the can ends. A lower closure member is provided, as illustrated in Figure 2, by an annular plate 77 which is fixed to the skirt 74 and which, as shown in Figure 1, has holes 78 formed at intervals for reception of the lifter pads 27. The annular plate 77, which is a rotating part of the machine, is in sliding engagement with the notched edge 80 of a sealing ring 81 which is bolted to the outer portion of the housing, which will now be described in detail.

Figure 4:
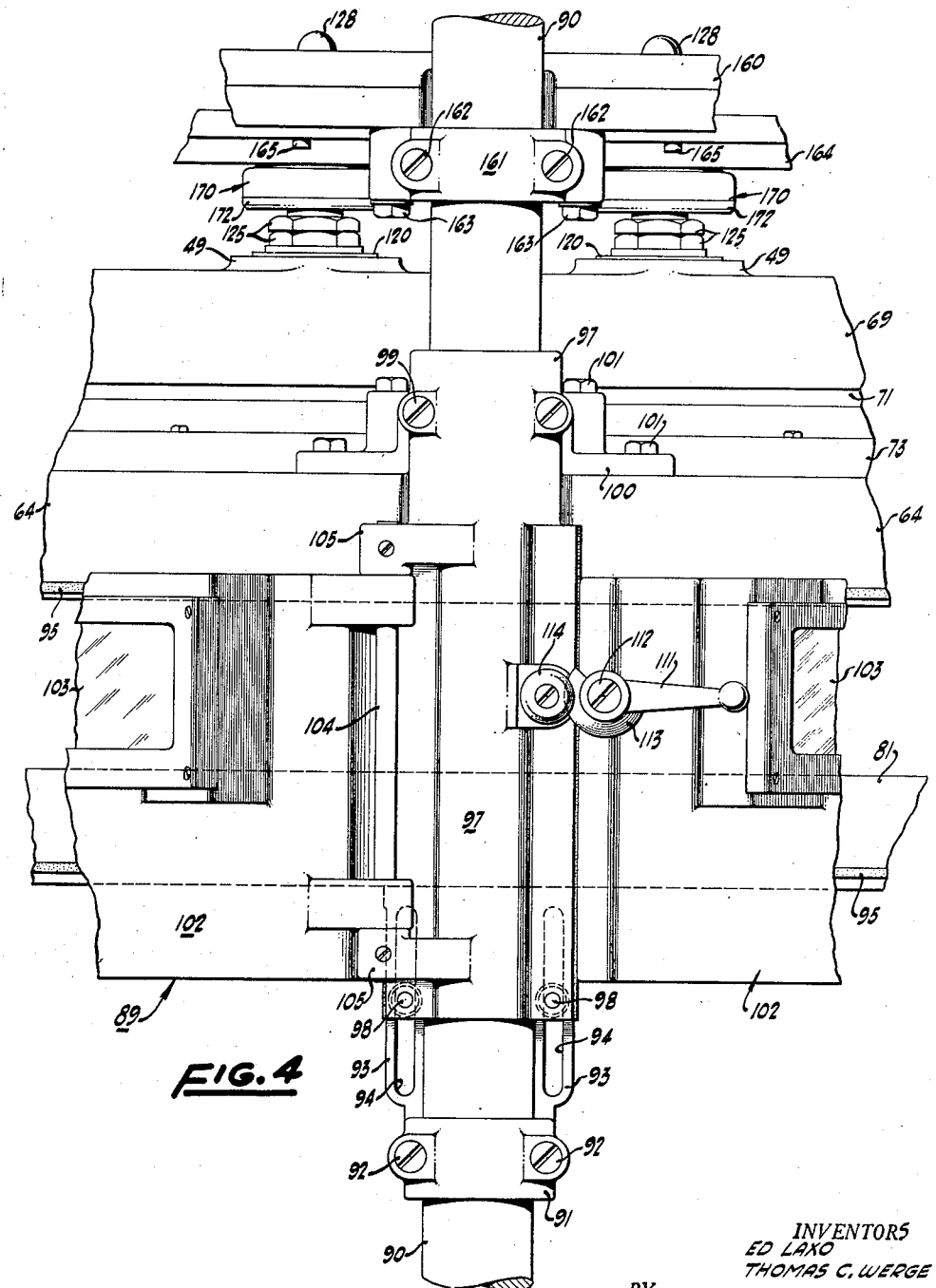
Figure 4 is a fragmentary view in side elevation of the exterior of the machine as seen along the line 4—4 of Figure 3.

Referring now to Figures 3 and 4, as well as to Figures 1 and 2, a sectional outer wall 89 is provided which is mounted in the manner hereinafter described. A suitable number, e. g., three vertical posts 90 are provided which are fixed to the framework of the machine, two such posts being shown in horizontal section in Figure 3. To each of the posts 90 is attached a split collar 91 which is clamped to the post at the desired height by means of screws 92. Integral with the collar 91 are a pair of brackets 93 located on opposite sides of the post 90 and each formed with a vertical slot 94. As will be seen in Figure 2, the sealing ring 81 is fixed to and is supported by the brackets 93, and as shown in Figure 1 the sealing ring 81 is provided with a sealing gasket 95 which bears against the inner surface of the adjacent wall section 89. The latter, as illustrated in Figure 1, is of double wall construction to provide a space within which a suitable insulating material, indicated at 96, may be deposited. A sleeve 97 is provided which is adjustable vertically on the post 90 and which is secured in adjusted position as by means of screws 98 which are shown in Figures 2 and 4. Screws 99 also serve to clamp the sleeve 97 in adjusted position on the post 90. Each wall section 89 is mounted on two of the sleeves 97, as by means of brackets 100 which are integral with the sleeve, and screws 101. Each of the two wall sections 89 illustrated in Figure 4 has a door 102 having a window 103 of Pyrex or other heat resistant glass for viewing the interior of the closing machine. Each door 102 is pivoted on a rod 104 which is fixed to bosses 105 integral with the adjacent sleeve 97. Set screws 110 are employed to clamp the rod 104 to the bosses 105. Means for latching each of the doors 102 in closed position is provided in the form of a handle 111 rotatable on a pivot shaft 112 and a cam 113 fixed to the handle and engageable with a latch member 114 formed with a groove 115 (see Figure 3) for reception of the cam 113.

It will, therefore, be apparent that the closing machine 10 is provided with an annular chamber 116, which is best shown in Figure 2 and which is substantially completely enclosed. The closing or seaming operation is accomplished within this chamber, which is provided with means in the form of the pipe 66 for introduction of steam or other sterilizing gas. The chamber 116, although it is not airtight, prevents free access of ambient air. By maintaining a positive pressure of steam or other sterilizing gas in the chamber 116, any tendency of air to leak in from the outside is prevented. Moreover, the steam or other sterilizing gas will sterilize any small amount of air that may chance to leak in.

Other features which may be noted at the present point, are the fact that the doors 102 are shiftable vertically and, when they are shifted, they will simultaneously shift the seaming bar 63. This permits vertical adjustment of the seaming bar 63 and adjustment of the seaming chamber 116 for can bodies of different heights.

Referring now more particularly to Figure 1, each seaming chuck assembly 50, as noted above, comprises a spindle 60 to the lower end of which is threaded a seaming chuck 61. A guard member 117 is provided for each chuck. The spindle 60 is rotatably mounted in an eccentric member 120 which is shown in vertical section in Figure 1 and in perspective in Figure 10, such eccentric having a cylindrical outer shape, being free to rotate in the sleeve 49 and having an eccentric bore at 121. The spindle 60 is journaled in bearings 122 and 123 and the assembly, including the spindle 60 and the chuck 61, are held in place against vertical displacement by a keeper ring 124 at the bottom, a shoulder 124a and nuts 125. The spindle 60 is formed with an axial bore 126 through which extends a knockout rod 127 having a rounded cap 128 threaded to its upper end. The purpose of the knockout rod 127 is to positively remove a closed can from the seaming chuck 61 at the conclusion of a seaming operation. Such knockout operation is accomplished by contact of the cap 128 with a knockout cam (not shown) so located as to contact the cap 128 at the conclusion of the seaming operation and thereby cause the knockout rod 127 to move downwardly in opposition to the expansive forces of an expansion spring 129. The rod positively detaches the closed can from the seaming chuck, and the spring 129 operates automatically to restore the knockout rod 127 to its normal, up position after the cap 128 has passed the knockout cam.

Referring to Figures 10, 11 and 12, it will be seen that the eccentric member 120 is dished out along its side wall at 135 and 136 to provide corresponding concave clearance recesses for clearance purposes, and that it is formed with a laterally projecting tongue 137. As is best shown in Figures 11 and 12, the tongue extends outwardly to the inner surface of sleeve 49 upon which it is free to rotate except for the restraining means described hereinafter. As shown in Figures 11 and 12, although the eccentric member 120 has a cylindrical outer contour except for the recesses 135 and 136, nevertheless the bore 121 is located eccentrically with respect to the axis of the member 120. As a result, the seaming chuck spindle 60 is also eccentric with respect to the member 120. Referring now more particularly to Figures 5, 6 and 7, the sleeve 49 is formed with a boss or extension 138 which is bored out at 139 to receive sleeves 140 and 141 and also a cup 142. A cap screw 143 extends slidably through the sleeve 140, is countersunk therein and is threaded at its inner end into the boss 138. A cap screw 144 extends slidably through the sleeve 141 and is countersunk therein, and it also extends slidably through the cup 142 and is threaded at its inner end to a square nut 145. An expansion spring 146 is compressed between the nut 145 and the closed end of the cup 142. A cap screw 150 extends slidably through a hole 151 formed in the boss 138 and is threaded at its inner end into an insert 152 upon which the nut 145 rests and which prevents rotation of the nut. The cup 142 has a shoulder 153 which bears against the outer end of the insert 152. Also, the closed end of cup 142 bears against the inner end of sleeve 140. As is best shown in Figure 7, the sleeve 141 is hollowed out along its length for clearance purposes.

It will be apparent from an inspection of Figure 6 that the tongue 137 of the eccentric 120 is disposed between the sleeve 141 and the cup 142. It will also be apparent that the tongue 137 is urged to the left as viewed in Figure 6 (i. e., clockwise as viewed in Figure 11), by the expansion spring 146. The extent of its travel in such direction is, however, limited by engagement of the shoulder 153 of cup 142 against the outer end of the insert 152. The degree of force thus exerted on the tongue 137 can be adjusted by rotating the cap screw 144 inwardly or outwardly with reference to the nut 145, thereby increasing or decreasing the expansive force of the spring 146 and, accordingly, increasing or decreasing the force urging the tongue 137 and the eccentric 120 in clockwise direction as viewed in Figure 11. Moreover, the normal position of the tongue 137 can be adjusted by rotating the screws 143 and 150 to advance or retract the positions of the sleeve 140 and the insert 152. It will also be apparent from an inspection of Figure 6 that, except for the expansive force of the spring 146, the tongue 137 and the eccentric member 120 are free to rotate to the right as viewed in Figure 6 or in counterclockwise direction as viewed in Figures 11 and 12. Such movement is resisted by the spring 146, which will tend to maintain the tongue 137 and the eccentric 120 in and restore them to their normal position, which is shown in Figure 11. As noted above, this "normal position" can be adjusted by manipulation of the cap screws 143 and 150, and the force tending to hold the tongue and eccentric in and restoring them to the "normal position" can be adjusted by manipulation of the cap screw 144.

Referring now more particularly to Figures 11 and 12, it will be apparent that if the normal position of the tongue 137 and the eccentric member 120 is that indicated in Figure 11, then if an extra thickness of metal is encountered in the seaming operation, as at the junction of a double end seam and a can body side seam, the extra thickness of metal will exert a radial, inward force on the seaming chuck 61 and the spindle 60 and that, by reason of the eccentric relation between the spindle 60 and the eccentric member 120, the latter will be rotated in counterclockwise direction to a position such as indicated in Figure 12. During such rotation the tongue 137 will move the sleeve 141, the cap screw 144 and the nut 145 to the right as viewed in Figures 6 and 12. This movement will, of necessity, compress the spring 146. When the point of extra metal thickness has been passed and a normal metal thickness is encountered, the spring 146 will instantly rotate the tongue 137 and the eccentric member 120, together with the spindle 60 and the seaming chuck 61, back to the normal position illustrated in Figure 11. The counteracting forces of the spring 146 and of the seaming bar 63 (and the metal of the can body and can end), provide a lever action flulcrummed on the central axis of the eccentric member 120. This lever action is effective to continuously conform the position of the seaming chuck to the thickness of metal between the seaming chuck and the seaming bar.

It will, therefore, be apparent that a resilient, eccentric mounting is provided for the spindle 60 and seaming chuck 61, which permits yielding of the seaming chuck in response to an extra thickness of metal but which will maintain the seaming chuck, the seaming bar, the can body flange and the curl of the can end in operative engagement at all times.

Referring now more particularly to Figures 1, 4 and 8, a means is illustrated in Figures 1 and 4 for providing a positive drive for each spindle 60. A frame ring 160 is provided which is mounted on the posts 90 and which extends about the circumference of the machine. This frame ring is shown in side elevation in Figure 4 and in transverse section in Figure 1. It is mounted on the posts 90 by means of split collars 161 which are clamped in adjusted position on the posts 90 by means of cap screws 162. Cap screws 163 are employed to bolt the collars 161 to the frame ring 160. As shown in Figure 1, a ring gear 164 is provided which is bolted, as by means of bolts 165, to the frame ring 160. Each seaming chuck assembly 50 is provided with a drive pinion 167 which meshes with the ring gear 164 and which is fixed, as by means of cap screws 168, to the driving member 169 of an overrunning clutch 170. A cover plate 171 is provided to seal the upper portion of the clutch and a plate 172 is provided for the bottom thereof. As is best shown in Figure 8, the driven member 173 is of generally square cross section but is provided with outwardly projecting ears 180 each having an outer surface 181 of cylindrical contour adapted to rotate freely on the inner surface of the driving member 169. There are thus provided four sectors or pockets 182 each of which contains a roller 183 free to rotate therein and each of which also contains a plunger or piston 184 having an outer end portion 185 of cylindrical contour adapted to rotatably engage the roller 183 and having an inner surface bearing against the corresponding ear 180. Each plunger 184 and its ear 180 are formed with mating sockets 186 and 187, respectively, for reception of an expansion spring 188 which urges the corresponding roller 183 outwardly into the pocket 182.

It will be apparent that, apart from the operation of the overrunning clutch 170, the seaming chuck 61 will be rotated in clockwise direction as viewed in Figure 8 due to counterclockwise rotation of the main drive shaft 12 and of the upper and lower assemblies 14 and 15. Meanwhile the pinion 167 of each of the seaming assemblies 50 will also rotate in clockwise direction as viewed from above, owing to its meshing relation with the ring gear 164. The seaming chuck 61 has a somewhat smaller radius than the pinion 167. Hence, since both the seaming chuck 61 and the pinion 167 are coaxial and revolve at the same speed about the axis of shaft 12, and as long as proper frictional engagement of the chuck 61 and seaming bar 64 continues, the chuck 61, hence the driven element 173 of clutch 170, will rotate faster about the spindle axis than the pinion 167. As long as this condition prevails, the driven member 173 will simply overrun the driving member 169. However, if for any reason (such as slippage of the seaming chuck 61 and the can body 28 and associated can end on the seaming bar 63), the seaming chuck slows down to a rotary speed such that the driven member 173 is rotating at a lesser speed than the driving member 169, the expansive force of the springs 188 will force the rollers 183 outwardly into the pockets 182 and will cause them to wedge between the driving and driven members 169 and 173, as indicated in Figure 9. A driving engagement between these members is therefore provided and as long as such condition prevails, the pinion 167 will provide a positive drive for the spindle 60 and the seaming chuck 61.

It will, therefore, be apparent that an overrunning clutch mechanism has been provided for driving the spindle and the seaming chuck whenever the latter tends to slow down or skid for any reason. However, this positive drive for the spindle and the seaming chuck avoids the disadvantage noted above of a positive drive which operates continuously, such as a pinion fixed to the spindle and meshing with a ring gear. Thus, the normal tendency of the spindle 60 is to rotate faster than the driving pinion 167, and the spindle is free to rotate at such greater speed while the driven element of the clutch overruns the driving element thereof. The latter takes over the driving function only when needed.

It will, therefore, be apparent that a closing machine has been provided with satisfies a number of objects. It is of a type adapted to conduct aseptic canning or closing operations, being provided with an enclosed seaming chamber and with means for introducing a sterilizing gas into such chamber. Moreover, the sterilizing gas is introduced at the proper point, namely, at the upper end of each can which is being closed. The mounting of the spindle described above and illustrated in the drawings is advantageous for several reasons. It has the advantages of the yieldable spindle mounting of the Laxo application, thus allowing yielding of the seaming chuck in response to an extra thickness of metal but at all times maintaining the seaming chuck in operative engagement with the seaming bar. In addition, the spindle mounting thus described and illustrated is simpler than and is more easily and readily adjustable than the spindle mounting of the Laxo application. Thus, the normal position of the seaming chuck can be easily adjusted by manipulation of the cap screws 143 and 150 and, when adjusted, it is firmly clamped in place subject only to the desired yielding in response to an extra thickness of metal. Also, whenever the spindle yields inwardly in response to an extra thickness of metal, the motion of the spindle is one of rolling about the central axis of the member 120. Consequently there is no tendency for the pinion 167 to dig into the ring gear 164, as there would be if the spindle were rocked about a horizontal axis.

The overrunning clutch mechanism for positively driving the seaming chuck when the latter slows down or tends to go into a skid, has important advantages as noted above. Thus it insures constant spinning of the seaming chuck but is operative only when needed.

Among other advantageous features of the machine, there may be mentioned the following: The machine is easily and quickly adjustable for can bodies of different height. In making these adjustments, the upper assembly is cranked up or down the main shaft 12 and is clamped in adjusted position, and the wall sections 89 are loosened on the posts 90, moved up or down to the desired position, then clamped in adjusted position.

We claim:

1. A closing machine of the type comprising a stationary circular seaming bar, at least one seaming chuck cooperable therewith to apply can ends to can bodies and to form end seams, carrier means for revolving said chuck to cause the same to travel along the seaming bar, said machine also comprising means mounting said chuck on said carrier means, said mounting means comprising an eccentric member having a cylindrical outer shape and rotatable within the carrier, said chuck being received eccentrically within said eccentric member and free to rotate therein, a tongue projecting from said eccentric member, and resilient means acting on said tongue to normally urge said chuck towards its seaming bar but yieldable in response to an extra thickness of metal to cause retraction of the seaming chuck from the seaming bar.

2. A closing machine of the type comprising a circular seaming bar having a circular seaming groove along its concave inner edge; a central, vertical drive shaft arranged perpendicularly to the plane of the seaming bar; a carrier fixed to the drive shaft for rotation therewith; a plurality of seaming chucks each having a seaming edge for rolling in said seaming groove; said carrier member being formed with a cylindrical sleeve for each such seaming chuck; an eccentric member for each seaming chuck, such eccentric member having a cylindrical outer contour rotatable within a sleeve, said eccentric member having an outwardly projecting tongue and said sleeve being bored out to provide access to said tongue; a seaming spindle fixed to said seaming chuck and means rotatably mounting said seaming spindle within said eccentric member but eccentrically with respect thereto; resilient means acting on said tongue to rotate said eccentric member in a direction to urge the seaming chuck toward the seaming groove, and means for adjusting the normal position of said tongue.

3. A machine of the character described comprising a frame, a first forming member of substantial length and circular shape and a second forming member cooperable with the first member and in rolling contact therewith to effect a forming operation on a workpiece, said machine also comprising carrier means for carrying the second member to cause it to roll along the first member, said second member being rotatably mounted in the carrier means so as to be free to spin about its own axis at an angular velocity which is predetermined by its linear speed and its radius, and rotating means for positively rotating the second member whenever its angular velocity is less than said predetermined angular velocity, said rotating means comprising a pinion fixed to said second member and a gear meshing with the pinion and fixed to the frame, and an overrunning clutch connecting the pinion with such second member to drive the latter whenever its speed tends to drop below said predetermined speed.

4. A can closing machine of the type comprising a circular seaming bar having an inner circular seaming groove, a plurality of seaming chucks, means mounting the chucks for rotation through the arc of the seaming bar and in rolling, frictional contact therewith to cause each chuck to spin about its own individual axis at an angular velocity predetermined by its linear velocity and radius, and means for positively rotating each such chuck about its own axis whenever its angular velocity tends to diminish below said predetermined angular velocity, such means comprising a positive drive which operates continuously during rotation of the drive shaft of the machine and overrunning clutch means interconnecting such positive drive with such chuck.

5. A can closing machine of the type comprising a frame, a circular seaming bar fixed to the frame and having an inner circular seaming groove, a plurality of seaming chucks, means mounting the chucks for rotation through the arc of the seaming bar and in rolling, frictional contact therewith to cause each chuck to spin about its own individual axis at an angular velocity predetermined by its linear velocity and radius, and means for positively rotating each such chuck whenever its angular velocity tends to diminish below said predetermined angular velocity, such means comprising a pinion, a rack fixed to said frame and meshing with said pinion, and overrunning clutch means interconnecting said pinion drive with said chuck.

6. A can closing machine for applying can covers to can bodies which comprises a stationary seaming bar having a seaming edge lying in a seaming plane and adapted to receive the end flange of a can body and a superimposed can cover and to form an end seam therefrom as the can body end flange and can cover are moved along said seaming edge with a rolling motion; a seaming chuck for clamping together such can body end flange and can cover, said chuck having a chuck axis; means mounting said chuck for rotary movement about said chuck axis and for movement along said seaming bar in operative relation to said seaming edge, the angular velocity of said rotary movement being predetermined by the linear speed of the chuck and its radius; and means for positively rotating said chuck which comprises driving means operating while the chuck is moving along the seaming bar and overrunning clutch means for operatively connecting said driving means with said chuck when and only when the angular velocity of the chuck is less than said predetermined angular velocity.

References Cited in the file of this patent

UNITED STATES PATENTS

| Number | Name | Date |
| --- | --- | --- |
| 1,104,751 | Wegner | July 21, 1914 |
| 1,143,976 | Kruse | June 22, 1915 |
| 1,278,941 | Kruse | Sept. 17, 1918 |
| 1,313,998 | Kruse | Aug. 26, 1919 |
| 2,337,061 | Murch | Dec. 21, 1943 |